US011132285B1

(12) United States Patent
Sukhyani

(10) Patent No.: US 11,132,285 B1
(45) Date of Patent: Sep. 28, 2021

(54) ISSUE REPORTING CONTEXT SESSION IDENTIFIER FOR ISSUE TRACKING SYSTEMS

(71) Applicants: Atlassian Pty Ltd., Sydney (AU); Atlassian Inc., San Francisco, CA (US)

(72) Inventor: Kapil Sukhyani, Fremont, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/835,076

(22) Filed: Mar. 30, 2020

(51) Int. Cl.
*G06F 11/36* (2006.01)
(52) U.S. Cl.
CPC ...... *G06F 11/3664* (2013.01); *G06F 11/3636* (2013.01); *G06F 11/3692* (2013.01)
(58) Field of Classification Search
None
See application file for complete search history.

(56) References Cited

U.S. PATENT DOCUMENTS

| | | | |
|---|---|---|---|
| 2010/0205583 A1* | 8/2010 | Gebhardt | G06F 11/366 717/127 |
| 2016/0239777 A1* | 8/2016 | Lassau | G06Q 10/06316 |
| 2016/0364319 A1* | 12/2016 | Che | G06F 11/3664 |
| 2017/0192880 A1* | 7/2017 | Ramakrishnan | G06F 11/3672 |
| 2017/0270303 A1* | 9/2017 | Roichman | G06F 11/3668 |
| 2019/0042400 A1* | 2/2019 | Surace | G06F 11/3664 |
| 2020/0065218 A1* | 2/2020 | Bhosale | G06F 11/3664 |

* cited by examiner

*Primary Examiner* — Daxin Wu
(74) *Attorney, Agent, or Firm* — Brownstein Hyatt Farber Schreck, LLP

(57) ABSTRACT

An issue tracking system includes a host device executing an issue tracking service in communication with a client device executing at least one of an issue reporting application and/or an application under test. The issue reporting application generates a session identifier that defines a debugging session. The application under test can receive the identifier and tag logs or other data generated during the debugging session. The issue reporting application can thereafter receive the debugging data and can populate an issue report template based on that data.

16 Claims, 8 Drawing Sheets

ISSUE REPORTING CONTEXT SESSION IDENTIFIER FOR ISSUE TRACKING SYSTEMS

TECHNICAL FIELD

Embodiments described herein relate to issue tracking systems and, in particular, to systems and methods for defining and exchanging a session identifier specific to a selected issue reporting context for issue tracking systems.

BACKGROUND

An organization can leverage an issue tracking system to document and monitor completion of work related to a project or goal. In many cases, however, processes of adding, editing, and/or otherwise updating issues reports tracked by the system are unnecessarily time and resource consuming.

As a result, users of conventional issue tracking systems—especially quality control engineers leveraging mobile devices to input information to, and consume information from, such systems—often prefer to interact with such systems as little as possible, resulting in abstract, terse, undetailed, and/or high-level issue reports that are difficult to accurately tract.

SUMMARY

Many embodiments described herein take the form of an issue tracking system including at least a host server executing an issue tracking service and a client device (such as a mobile electronic device) executing an issue reporting application instance. The issue reporting application instance is in communication with the issue tracking service and is configured to: generate a session identifier; pass the session identifier to an instance of an application under test; receive debug data tagged with the session identifier from the instance of the application under test; select an issue report template based, at least in part, on the session identifier; and automatically populate at least one field of the issue report template based on the received debug data.

Related and additional embodiments may include a configuration in which the instance of the application under test is instantiated by the client device.

Related and additional embodiments may include a configuration in which the instance of the application under test includes a graphical user interface that presents the session identifier to a user of the instance of the application under test.

Related and additional embodiments may include a configuration in which the debug data includes at least one of a screen shot, a screen recording, a crash report, or a log.

Related and additional embodiments may include a configuration in which the session identifier may be passed by reference or by value to the application under test.

Related and additional embodiments may include a configuration in which the client device may be a first client device, and the instance of the application under test may be instantiated by a second client device. In such examples, the second client device may be in communication with the first client device and may be configured to transmit the debug data from the instance of the application under test to the issue reporting application. For certain embodiments, the second client device and the first client device are in communication with a proxy service configured to: receive the session identifier from the issue reporting application; pass the session identifier to the application under test; receive the debug data from the application under test; and pass the debug data to the issue reporting application.

Embodiments described herein take the form of a method of automatically populating an issue report to be submitted to an issue tracking system, the method including operations of: generating, by a first application instance, a session identifier; passing, by the first application instance, the session identifier to a second application instance; entering, by the second application instance, a debug mode in response to receiving the session identifier; receiving, by the second application instance, at least one user input to a graphical user interface of the second application instance; tagging, by the second application instance, debug information generated by the second application instance when in the debug mode with the session identifier; passing, by the second application instance, the tagged debug information to the first application instance; selecting, by the first application instance, an issue report template based on the session identifier; and populating, by the first application instance, the selected issue report template with the tagged debug information.

Related and additional embodiments may include a configuration in which the first application instance may be an issue reporting application communicably coupled to the issue tracking system.

Related and additional embodiments may include passing the populated issue report template to the issue tracking system.

Related and additional embodiments may include a configuration in which populating the selected issue report with the tagged debug information includes attaching a file extracted from the debug data to the selected issue report. Examples includes one or more of an audio file, a screen recording, or a screen shot.

Related and additional embodiments may include a configuration in which the first application instance and the second application instance are executed on the same electronic device. Alternatively, the instances may be executed by different electronic devices.

Further embodiments described herein take the form of a client device for interacting with an issue tracking system. The client device executes an instance of an issue reporting application configured to: render a graphical user interface; receive input from a user to the graphical user interface; generate a session identifier based on the input to the graphical user interface; receive debug data from a second application executed by the client device; select an issue report template based on the session identifier; and automatically populate a field of the issue report template based on the received debug data.

Related and additional embodiments may include a configuration in which automatically populating the field of the issue report template includes attaching a file extracted from the debug data.

Related and additional embodiments may include a configuration in which the debug data received from the second application may be tagged with the session identifier.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be

The use of the same or similar reference numerals in different figures indicates similar, related, or identical items.

DETAILED DESCRIPTION

Figure 1:
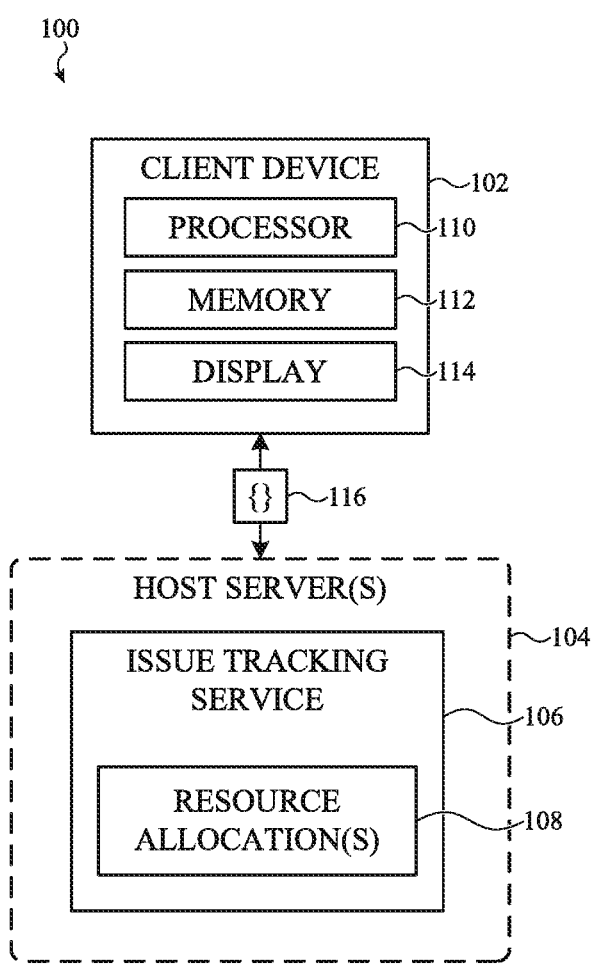
FIG. 1 depicts a simplified system diagram of an issue tracking system, such as described herein.

Embodiments described herein reference systems and methods for inputting detailed and contextually-relevant information to an issue tracking system in a time-efficient manner utilizing a client device communicably coupled to the issue tracking system. In many embodiments, although not required, the client device is a mobile device, such as a cellular phone, operated by a quality control engineer tasked with: (1) testing performance and operation of a an instance of a particular application (the "application under test") executing on that mobile device; and (2) if unexpected behavior (e.g., crashes, user interface errors, freezing, and so on) is discovered by the quality control engineer, generating an issue report describing behavior that may be submitted to the issue tracking system. Systems and methods described herein, and corresponding graphical user interfaces associated therewith, are configured to expedite processes of collecting, analyzing, and aggregating information obtained from, or otherwise describing behavior of, the application under test that may be inserted into an issue report submitted by a quality control engineer to an issue tracking system, such as described herein.

An "issue tracking system," as described herein, may be used to refer to a project management system or tool that can be implemented in whole or in part as software executed by a virtual, containerized, or physical server or other computing appliance or combination of appliances that provides a team of individuals with a means for communicating and exchanging information with one another. In many examples, an issue tracking system is configured for use by a software development team to exchange information that can facilitate the completion and assignment of discrete tasks related to software development projects from creation of new user stories (e.g., user-perspective feature requests or desired functionality), through proof of concept testing, through integration testing, through release of software to one or more users, and through reporting and fixing of software errors or inefficiencies ("bugs").

In many examples, an issue tracking system, however configured or used by a team of individuals or an organization, is implemented with a client-server architecture in which a host server or service of the issue tracking system exchanges requests and responses (which may comply with a communication protocol such as HTTP, TCP, UDP, and the like), with one or more client devices, each of which may be operated by a user of the issue tracking system. In other cases, event-driven architectures may be used. In this manner, a host server of an issue tracking system can serve information to each client device, and in response, each client device can render a graphical user interface on a display to present that information to the user of that respective client device.

Although it may be appreciated that an issue tracking system can be configured in many ways and/or can be leveraged by a number of different teams for a number of different purposes, including non-software purposes, for simplicity of description the embodiments described herein reference an issue tracking system configured for use by a software development team. In these constructions, the issue tracking system can be configured to receive from client devices one or more "issue reports" that contain information describing a task to improve the performance or function of a particular software application.

An issue report may capture user stories, epics, user interface improvements, designs or other non-functional tasks. In other cases, an issue report can capture information related to unintended behaviors of a given software product, typically referred to as a "bug." For simplicity of description, the embodiments that follow reference an issue tracking system configured for use by a software development team primarily to track bugs discovered in existing software products.

Embodiments described herein reference systems and methods for defining a start and an end of a debugging session during which debugging information from an application under test can be captured and, thereafter, consumed by an issue reporting application executed by the same or a different electronic device.

More specifically, embodiments described herein reference systems and methods for defining a session identifier that may be used to tag debugging information (e.g., memory utilization, processor utilization, framework/dependency utilization, object instantiation, performance profiles, logs, crash reports, user interface interactions, screen shots, screen recordings, audio recordings, and so on).

A client device, such as described herein, executing an issue reporting application can receive session-tagged debugging information and, in response, (1) can select an issue report template based on the session tag and, (2) can populate the selected template based on the received debugging information. As a result of these architectures and techniques, software tester (also referred to as a quality control engineer) can quickly populate an issue report template with information relevant to a particular bug in a particular software product without having to enter that information manually. In still further embodiments, an issue reporting application can be configured to detect or infer a session identifier from debugging data received from an application under test.

These foregoing and other embodiments are discussed below with reference to FIGS. 1-8 However, those skilled in the art will readily appreciate that the detailed description given herein with respect to these figures is for explanation only and should not be construed as limiting.

FIG. 1 is a schematic representation of an example issue tracking system, such as described herein. In the illustrated embodiment, the issue tracking system 100 is implemented with a client-server architecture including a client device 102 that communicably couples (e.g., via one or more networking or wired or wireless communication protocols) to a host server 104. It may be appreciated that other client devices may be configured in a substantially similar manner as the client device 102, although this may not be required of all embodiments and different client devices can be configured differently and/or may transact data or information with, and/or provide input(s) to, the host server 104 in a unique or device-specific manner.

In many embodiments, the host server 104 is configured to operate within or as a virtual computing environment that is supported by one or more physical servers including one or more hardware resources such as, but not limited to (or requiring) one or more of: a processor; a memory; non-volatile storage; networking connections; and the like.

The host server 104 can leverage such resources to instantiate a number of discrete subservices or purpose-configured modules, containers, or virtual machines each configured to perform, coordinate, serve, or otherwise provide one or more services, functions, or operations of the host server 104, such as an issue tracking service 106.

More specifically, the issue tracking service 106 can be configured to receive from the client device 102 (e.g., via user input provided through a graphical user interface rendered on a display, provided by the issue reporting application, or any combination thereof), without limitation: a request to open, create, or report an issue in a particular project; a request to modify an existing issue; a request to close an existing issue; a request to link an existing issue to another issue; a request to assign an issue to a particular user; and the like. More generally and broadly, however configured or implemented, the issue tracking service 106 of the host server is configured to manage and maintain a record of issues reported in one or more software development projects.

In addition, as noted above, the issue tracking service 106 of the host server 104 can be configured to communicably couple to the client device 102 in order to exchange information with and/or receive input(s) from the client device 102 in the course of tracking and/or documenting progress of completion of one or more issues of one or more projects tracked by the issue tracking system 100. In particular, in many embodiments, the client device 102 can be used by a quality control engineer to draft and/or otherwise generate issue reports that may be submitted to the issue tracking service 106 of the host server 104.

The client device 102 leveraged by the quality control engineer can be any suitable personal or commercial electronic device and may include, without limitation or express requirement, a processor 110, volatile or non-volatile memory (identified, collectively, as the memory 112), and a display 114. Example electronic devices include, but are not limited to: laptop computers; desktop computers; cellular phones; tablet computing devices; and so on. It may be appreciated that a client device 102, such as described herein, can be implemented in any suitable manner.

In many embodiments, the processor 110 of the client device 102 can be configured to execute an application (herein referred to as a "issue reporting application" or a "client application") stored, at least in part, in the memory 112. The issue reporting application can be used by a quality control engineer to access and communicate with the host server 104 and to securely transact information or data with, and provide input(s) to, the host server 104. In some embodiments, the issue reporting application may be a browser application configured to access a web page or service hosted by the host server 104 that is accessible to the client device 102 over a private or public network that may, in some embodiments, include the open internet.

In many embodiments described herein, the client device 102 is also configured to execute another application, referred to herein as an "application under test." The application can be any suitable application configured to perform any suitable function that may be tested by the quality control engineer. As with the issue reporting application, the application under test can leverage any resources of the client device 102 to perform its designated functions.

As a result of these architectures, a quality control engineer can leverage the client device 102 to launch the application under test and to conduct tests to the application under test in order to discover one or more bugs or issues in need of reporting to the issue tracking system 100. Thereafter, the quality control engineer can use the same client device, the client device 102 to launch the issue reporting application via which the quality control engineer can generate a new issue report (or update an existing issue report) to submit to the issue tracking service 106.

In these embodiments, however, the issue reporting application and the application under test can be configured to communicate with one another by exchanging computer-readable messages, shown as the object-formatted message 116, to define specific debugging sessions of the quality control engineer. More specifically, as described in greater detail with respect to embodiments that follow, the issue reporting application of the present and other embodiments can be configured to generate one or more session identifiers (e.g., universally unique identifiers, process IDs, and so on) that can be transmitted to the application under test before the quality control engineer begins testing that application. As a result, the quality control engineer's interactions with the application under test can be recorded, along with logs, processor utilization, memory utilization, crash reports, user interface hangs, and so on and can be tagged with the session identifier. Once a debugging session has completed (e.g., the quality control engineer closes the application under test and returns to the issue reporting application), the session identifier can be leveraged by the issue reporting application to populate an issue report template.

For example, in one embodiment, the application under test is a video game application. Through the course of testing the video game application, the quality control engineer may discover a user interface bug that presents an incorrect score. In this example, the quality control engineer can launch the issue reporting application and can operate a graphical user interface presented by that application to create a new issue report. The quality control engineer can populate bibliographic information in the issue report, such as a title (e.g., "Score UI bug for Game"), the quality control engineer's name (e.g., "John Doe"), the project (e.g., "Video Game Application"), and the type of bug (e.g., "GUI") noticed by the quality control engineer. The quality control engineer may also provide a plain text description of the observed behavior.

Thereafter, the quality control engineer can return to the video game application and can repeat steps necessary to reproduce the bug identified by the quality control engineer. Thereafter, the quality control engineer can return to the issue reporting application to find that crash reports, screen shots, screen recordings, memory profiles, processor profiles, user interface element interaction timestamps, user interface element dwell times, and so on are automatically added to or otherwise attached to the previously partially-populated issue report.

In the background, to facilitate this automated behavior, the issue reporting application can generate a session id when the quality control engineer begins populating the issue report. The session id is locally linked, by the issue reporting application, to the issue report being populated by the quality control engineer. Thereafter, once the quality control engineer instructs the application under test to enter the foreground of the graphical user interface rendered by the display 114, the application under test can enter a debugging mode. More specifically, the application under test can elevate a logging level from production to debug, can begin writing logs to persistent memory and so on. In some embodiments, the application under test may include a framework or dependency configured to communicably couple to the issue reporting application, whereas in other embodiments, the application under test may communicably couple to the issue reporting application directly.

Independent of the manner by which communication between the application under test and the issue reporting application occurs, actions of the application under test can be tagged with, or otherwise associated with the session identifier generated by the issue reporting application. In this manner, when the quality control engineer returns to the issue reporting application, that application can receive from the application under test session-tagged debugging information such as screen shots, screen recordings, logs, profiles, crash reports, user interaction histories/timelines, and so on. Each of these data items can be analyzed and/or categorized by type and inserted into or attached to specific fields of the issue report draft prepopulated by the quality control engineer. For example, crash reports received from the application under test may be automatically attached as files to the issue report. In another example, screen shots, screen recordings, and/or audio recordings can be inserted into a body or description portion of the issue report. A person of skill in the art may appreciate that the foregoing examples are not exhaustive; any suitable technique or analysis can be performed to automatically insert content received from an application under test (that is session-tagged) into any suitable field of an issue report.

In some examples, the issue reporting application may generate one or more tokens that can be used by the quality control engineer to insert into the issue report draft. In these examples, data may not be automatically inserted into the issue report draft; instead, it may be readily available to and conveniently accessible by the quality control engineer.

As a result of these constructions, a quality control engineer leveraging an issue tracking system and, specifically, an issue reporting application such as described herein can be presented with substantially all information necessary to describe an issue or bug without requiring the quality control engineer to constantly switch between an application under test and the issue reporting application. These examples and techniques may be particularly helpful to a quality control engineer when the quality control engineer is testing multiple features of multiple applications executing on the same client device, such as the client device 102. For example, in these embodiments, the quality control engineer can perform multiple discrete tests against multiple discrete features of multiple discrete applications without requiring the quality control engineer maintain notes or files corresponding to each application or each feature being tested.

For example, in one embodiment the quality control engineer may desire to test Feature A and Feature B of a particular application. In this example, issue reports tracking bugs in Feature A and Feature B may share substantially all bibliographic data—the quality control engineer's name, the name of the application under test, the name of the responsible software development team, and so on, may be the same for each issue report. This type of data may also be referred to herein as shared "context data" or "context information." In these examples, the quality control engineer can leverage the issue reporting application to generate a template issue report containing the overlapping data. Thereafter, the quality control engineer can instruct the issue reporting application to begin a first debugging session, Session A, that corresponds to Feature A and a second debugging session, Session B, that corresponds to Feature B. In one embodiment of this example, the quality control engineer can select Session A via a user interface of the issue reporting application and can switch to the application under test to perform steps to reproduce an issue with Feature A. Thereafter, the quality control engineer can return to the issue reporting application and can select Session B via the user interface. Thereafter, the quality control engineer returns to the application under test to perform steps to reproduce an issue with Feature B. Thereafter, the quality control engineer can return to the issue reporting application and can be met with two populated issue reports, one corresponding to Feature A and one corresponding to Feature B. The issue report for Feature A includes attachments and debugging information obtained during Session A and the issue report for Feature B includes attachments and debugging information obtained during Session B. As a result of these embodiments and techniques for defining debugging sessions, the quality control engineer can quickly review the content of each populated issue report and can submit those reports to the issue tracking system 100.

It may be appreciated that the foregoing examples are not exhaustive of benefits of a system, such as described herein. A person of skill in the art may readily appreciate that for certain devices, especially mobile devices with small screens, it may be difficult for a quality control engineer to manually add content to an issue report due, at least in part, to the cumbersome nature of performing data entry tasks on small-size touch screen devices. Embodiments described herein account for these shortcomings by automatically aggregating and sorting debugging information obtained directly (or indirectly) from applications under test.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
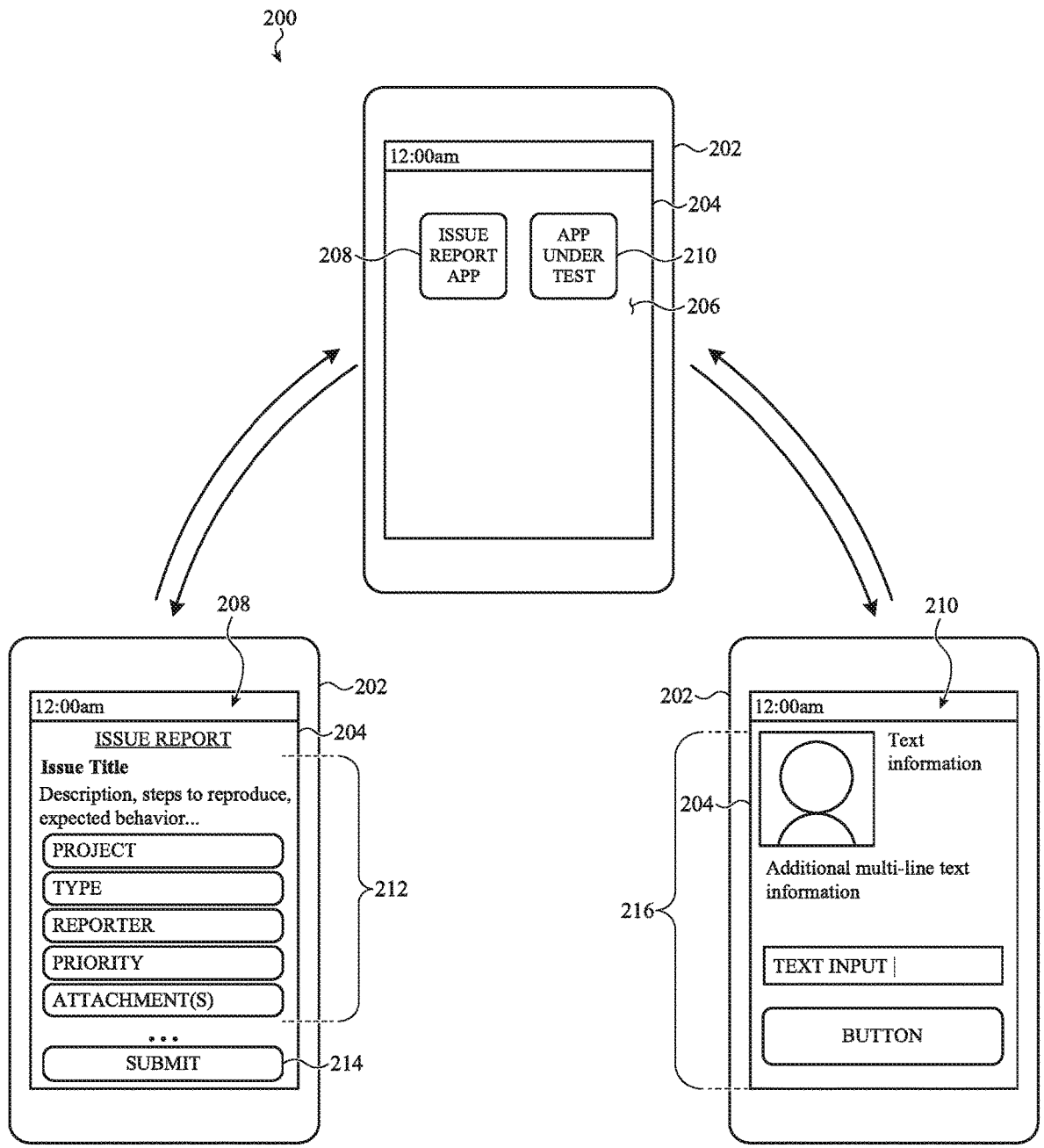
FIG. 2 depicts an example client device that may communicably couple to an issue tracking system, such as depicted in FIG. 1, the client device executing an instance of an application under test and an instance of an issue reporting application.

FIG. 2 depicts an example client device that may communicably couple to an issue tracking system, such as depicted in FIG. 1, the client device executing an instance of an application under test and an instance of an issue reporting application, such as described above in reference to FIG. 1. In this example, the issue tracking system 200 includes a client device 202 that can communicably couple to an issue tracking service, omitted from the figure for simplicity. An issue tracking service may be instantiated by a host server, such as the host server 102 of FIG. 1 and may be configured in a similar manner; this description is not repeated.

In this example, the client device 202 includes a display 204 that renders a graphical user interface 206. The client device 202 is configured to launch one or more applications, such as an issue reporting application 208 and an application under test 210. In these examples, and as described above with respect to FIG. 1, the issue reporting application 208 can be configured to leverage the display 204 of the client device 202 to render a graphical user interface 212 that can be leveraged by a quality control engineer to enter information into an issue report that may be transmitted to the issue tracking service. Example information that can be added via the graphical user interface 212 includes, but is not limited to: an issue title; an issue description; a project identifier; a bug/issue type; an issue reporter (e.g., the quality control engineer); an issue priority or severity; and so on. In these examples, once sufficient information has been added to the issue report—either automatically by operation of methods and techniques described herein to leverage debugging sessions and session identifiers or manually by a quality control engineer—can be submitted to the issue tracking service by the quality control engineer engaging a submit button 214.

It may be appreciated that the simplified user interface 212 is merely one example; other implementations include a greater number of elements, a fewer number of elements, a different arrangement or order, and so on.

The client device 202 may also be configured to execute an instance of the application under test 210 which, like the issue reporting application 208 can leverage the display 204 to render a graphical user interface 216 including a number of user interface elements.

In these examples, as noted above with respect to other embodiments described herein, the application under test 210 and the issue reporting application 208 can be configured to exchange information, including debugging information and/or session identifier information. Such examples are described in greater detail with respect to the embodiments and figures that follow.

Figure 3:
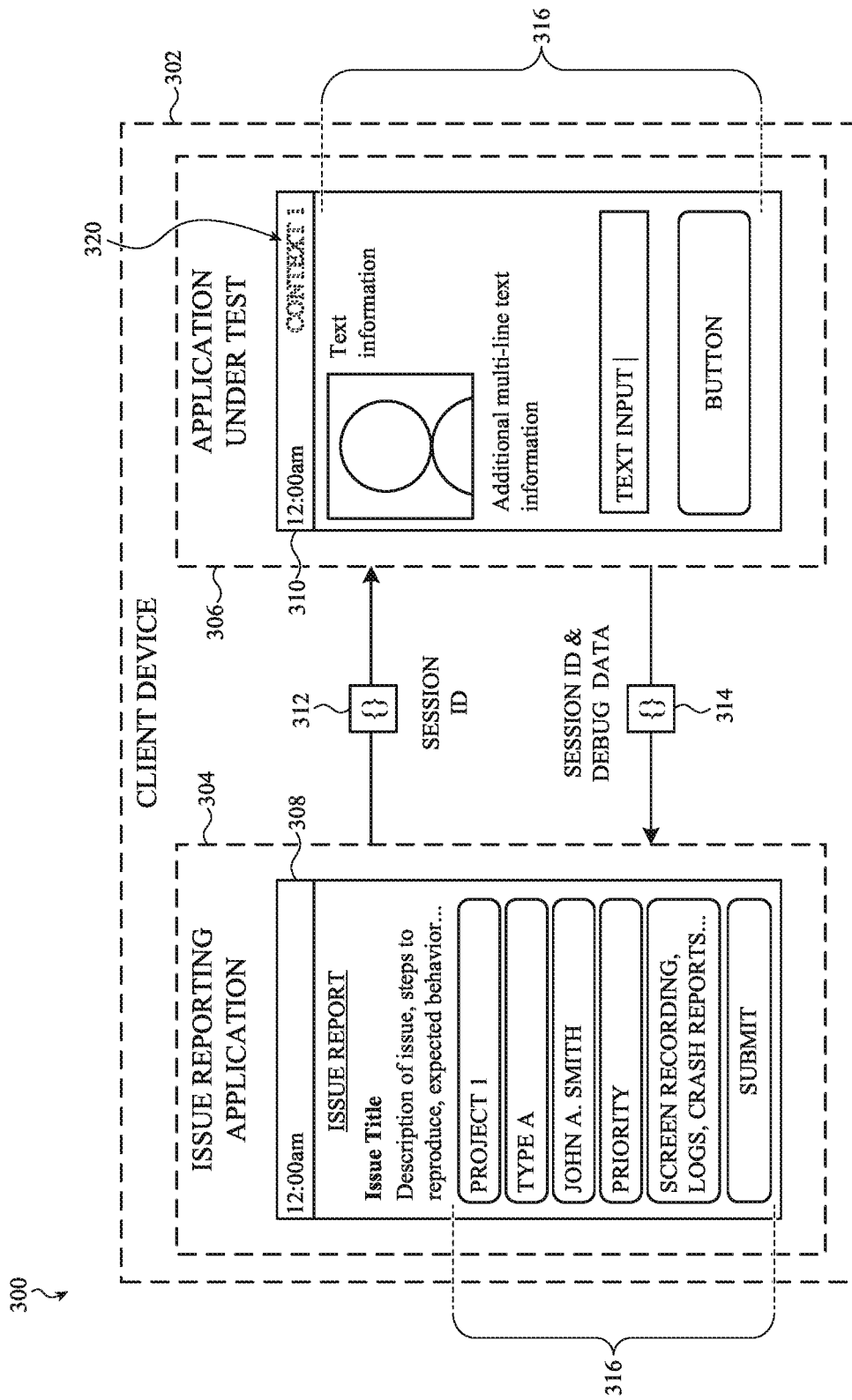
FIG. 3 depicts a system diagram of an example client device, such as described herein, executing an instance of an application under test and an instance of an issue reporting application.
Figure 4:
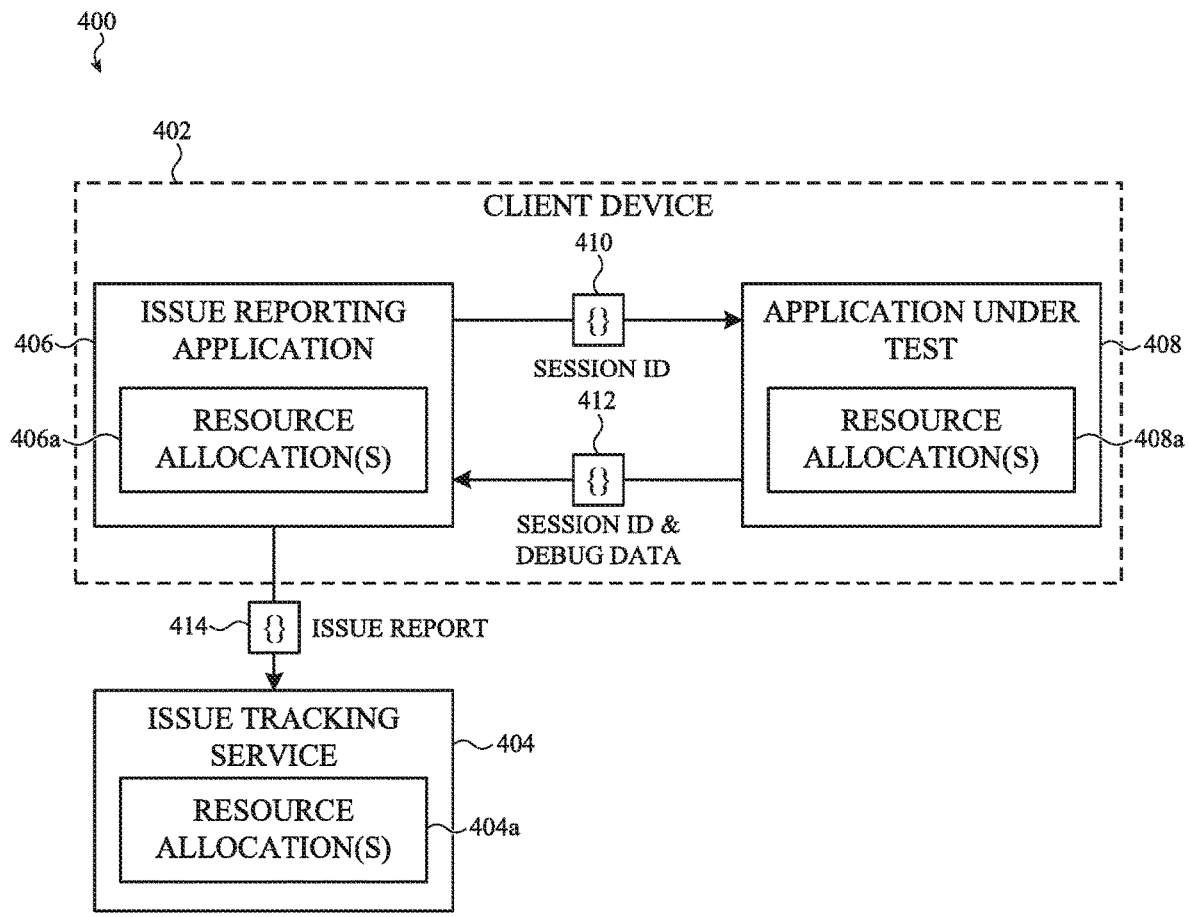
FIG. 4 depicts a system diagram of an example client device, such as described herein, configured to facilitate exchange of session data and/or context data between an instance of an application under test and an instance of an issue reporting application.

For example, generally and broadly, FIGS. 3-4 depict embodiments in which a single client device may be used to execute and/or instantiate (1) an application under test and (1) an issue reporting application configured to communicate with an issue tracking service, such as described herein.

In these embodiments, as described above, an issue reporting application may be configured to generate an identifier, referred to herein as a "context key" or a "session identifier," that can be received by and used by the application under test to tag or otherwise categorize, sort, or organize information ("debugging information") generated during a debugging session of that application performed by a quality control engineer or other user of the application under test.

More specifically, an issue reporting application may generate a user interface that can be leveraged by a quality control engineer to initiate a debugging session that is associated with a particular issue report that describes a particular function (or limited set of functions) of a particular application (or limited set of applications). In these and related examples, the issue reporting application (1) generates a session identifier and (2) transmits the session identifier to the application under test leveraging a suitable and secure inter-application communication technique. Thereafter, the application under test (1) receives the session identifier, (2) enters a debugging mode, (3) collects information describing its behavior (e.g., memory utilization, processor utilization, object instantiation/utilization, memory allocation/leaks, execution profiling information, stack traces, user interface elements displayed/engaged, dwell times, hardware types, process lists, logs, crash reports, and so on) while the debugging mode is active, (4) packages all captured debugging information and associates it with the session identifier received from the issue reporting application and, (5) returns the session identifier and the collected/aggregated debugging information back to the issue reporting application.

Thereafter, the issue reporting application can populate an issue report template that is selected based on the session identifier with the debugging information, inserting into and/or attaching to the template all or some of the debugging information and/or information derived therefrom (e.g., extracted information, metadata, screenshots, screen recordings, audio recordings, and so on). Alternatively or additionally, the context information/debugging information is extracted from the application under test and used to populate the template.

As a result of these systems, techniques, and methods, a quality control engineer leveraging the issue reporting application may be able to provide more information-rich issue reports in a substantially faster manner, especially if the issue reporting application and/or the application under test are instantiated on a mobile device, such as a cellular phone or tablet. These and related examples are described in reference to FIGS. 3-4.

Debugging information and/or session identifier information, such as described herein and exchanged between instances of applications such as depicted in FIGS. 3-4, may be computer-readable data or otherwise object-formatted data describing, logging, or otherwise capturing operations performed to, by, or with the application under test. In this manner, and as a result of this architecture, an application under test can communicate relevant debugging information directly to an issue reporting application which can receive such information and consume that information to populate an issue report selected based on a context key or session identifier, without requiring intervention by a user such as a quality control engineer.

In a more simple, non-limiting phrasing, embodiments described herein leverage a session identifier to define a "debugging session" that is associated with a particular function of a particular application under test; debugging information generated during the debugging session can be used to populate an issue reporting template describing the function of the application (and/or differences between intended and observed behavior), to add attachments or further information to an existing issue report, or for any other suitable purpose.

In further embodiments, an issue reporting application, such as described herein can generate, and can be configured receive multiple, discrete session identifiers (along with any debugging information tagged with those session identifiers) so as to efficiently handle input of debugging information from multiple different applications under test, substantially simultaneously.

In a more simple, non-limiting phrasing, for embodiments described herein, a quality control engineer can leverage an issue reporting application that generates session identifiers to consume and organize debugging information from multiple applications under test. In these examples, the quality control engineer can leverage the issue reporting application to generate detailed and data-rich issue reports describing related or simultaneous behaviors of individual applications under test, cooperative or dependent behaviors of different applications, behaviors of applications under test and host operating systems, and so on. More simply, it may be appreciated that embodiments described herein substantially expedite the processes associated with producing detailed and data-rich issue reports, allowing quality control engineers (among other users leveraging an issue tracking system) to generate a greater quantity of issue reports, generate higher quality issue reports more rapidly, and/or address bugs in software products at a substantially faster pace.

In view of the foregoing, it may be appreciated that generally and broadly, an issue reporting application (such as described with reference to FIGS. 3-4) can leverage a session identifier/context key to consume debugging information received from an application under test to populate one or more issue report templates selected based on the session identifier/context key. As a result of these techniques, a single issue reporting application may be leveraged to collect, sort, and insert into multiple discrete issue report templates debugging information from a number of applications under test without requiring any intervention by a user, such as a quality control engineer. As may be appreciated, this construction may be especially useful when testing multiple applications, and/or interoperation(s) thereof and therebetween, on a single client device by a single user, such as a quality control engineer or software tester utilizing a mobile device such as a smart phone.

For example, a software tester or quality control engineer may be tasked with testing a graphical user interface of a Calendar Application. Through testing, the quality control engineer may determine a specific sequence of actions that cause the Calendar Application to fail. In this case, the quality control engineer can launch an issue reporting application on the same electronic device executing on the same electronic device executing the Calendar Application to report the crash, steps to reproduce the crash, and any other relevant information to an issue tracking service.

If the quality control engineer leverages a conventional issue reporting application, the quality control engineer is typically required to continually switch between the Calendar Application and the issue reporting application in order to capture all relevant debugging information describing the issue. This information obtained by the quality control engineer is used to populate an issue report that, in turn, is submitted by the quality control engineer to an issue tracking system. For example, the quality control engineer may launch the conventional issue reporting application, select a project associated with the Calendar Application, and create a new issue report. The quality control engineer thereafter populates various data fields of the new issue report, including his or her name, details describing the observed behavior, and so on. Thereafter, the quality control engineer returns to the Calendar Application to capture screen shots, screen recordings, or other data that can be attached to the issue report once the quality control engineer returns to that application.

A person of skill in the art will readily appreciate the cumbersome nature and time inefficiencies of the foregoing description of conventional issue reporting architectures. More specifically, a person of skill in the art will readily appreciate that these conventional time consuming mechanisms of reporting issues to issue tracking services catalyze a strong incentive for quality control engineers to only provide a bare minimum quantity (and quality) of information for any given issue report. In a more simple phrasing, it is inconvenient to constantly switch between applications to capture information necessary to hydrate a blank issue report.

Accordingly, in contrast with the above-described conventional implementation, an issue reporting application leveraging methods described herein can be used by the quality control engineer of the preceding example. In particular, leveraging systems and methods described herein, the quality control engineer can launch the issue reporting application (in this example, the "Issue Reporting Application") and select a user interface element indicating to the Application that the quality control engineer intends to draft an issue report that details the behavior of the Calendar Application observed by the quality control engineer. The quality control engineer can begin by adding basic information to the issue report, such as the quality control engineer's name, the application type, a title for the issue report, and so on. In some examples, the quality control engineer may be able to select a partially prepopulated template. In the background, the Issue Reporting Application generates a session identifier, which may be a universally unique identifier or other numerical or alphanumerical value. Once the quality control engineer switches to the Calendar Application (in this example, the application under test), the issue reporting application can communicate the session identifier to the Calendar Application. Thereafter, the Calendar Application can be used by the quality control engineer to reproduce the bug noticed by the quality control engineer. In the background, after having received the session identifier, the Calendar Application can switch to a debugging mode and can begin recording actions taken by the quality control engineer (e.g., user interface interactions) and taken by the application itself (e.g., memory utilization, processor utilization, logs, framework/dependency usage, profiles, network utilization, crash reports, and so on). Once the behavior discovered by the quality control engineer has been reproduced, the quality control engineer can switch back to the Issue Reporting Application. In the background, the Calendar Application can send to the Issue Reporting Application the session-tagged debugging information captured during the debugging session identified by the session identifier. Thereafter, the Issue Reporting Application can mark the session associated with the session identifier as closed and can parse the debugging information in order to populate the issue report previously opened by the quality control engineer. For example, the Issue Reporting Application may be configured to, without limitation: attach screen shots to the issue report; attach screen recordings to the issue report; convert a log of user interface interactions into a human-readable timeline of actions taken by the quality control engineer, appending the timeline to a section of the issue report including steps to reproduce; update a title of the issue report based on a crash report; and so on. As a result of these constructions and techniques, the quality control engineer need only open the Calendar Application a single time in order to produce a high quality and data-rich issue report.

In further examples, as noted above, a quality control engineer may be required to test interoperation of multiple applications. In such cases, it may be unclear which application is the source of the bug or an unexpected behavior. For example, a software tester or quality control engineer may be tasked with testing how an Email Application and a File Storage Application executed on the same electronic device interact when appending an attachment to an email. Through testing, the quality control engineer may determine a specific sequence of actions that cause one or both of the Email Application or the File Storage Application to crash or otherwise behave in an unintended manner. In this case, the quality control engineer can launch an issue reporting application on the same electronic device executing the Email Application sand the File Store Application to report the crash, steps to reproduce the crash, and any other relevant information to an issue tracking service.

If the quality control engineer leverages a conventional issue reporting application, the quality control engineer is typically required to continually switch between the Email Application, the File Storage Application, and the Issue Reporting Application in order to capture all relevant debugging information for each application under test in order to populate one or more issue reports that, in turn, are to be submitted by the quality control engineer to an issue tracking system.

For example, the quality control engineer may launch a conventional issue reporting application, select a project associated with the Email Application, and open a new issue report. The quality control engineer thereafter populates various data fields of the new issue report, including his or her name, details describing the observed behavior, and so on.

Thereafter, the quality control engineer launches the Email Application to initiate a screen recording and/or to take a series of screen shots to provide more contextual information to the quality control engineer's notes accompanying the issue report. The quality control engineer thereafter relaunches the conventional issue reporting application, selects the yet-unsubmitted open issue report referencing behavior of the Email Application, and attaches screen recordings, screen shots, and/or other collected information. In some examples, the quality control engineer may also access and/or attach logs, stack traces, crash reports, or other information associated with operation(s) of the Email Application. Thereafter, the quality control engineer may submit the issue report to an issue tracking service. As may be appreciated, the foregoing tasks are cumbersome and time-consuming, especially if the quality control engineer is operating a mobile electronic device, such as a cellular phone.

Thereafter, the quality control engineer, still within the conventional issue reporting application, can select a project associated with the File Storage Application, and can open yet another new issue report. As with the Email Application, the quality control engineer populates various data fields of the new issue report, including his or her name, details describing the observed behavior of the File Storage Application, and so on. Thereafter, the quality control engineer launches the File Storage Application to initiate a screen recording and/or to take a series of screen shots to provide more information.

The quality control engineer thereafter relaunches the conventional issue reporting application, selects the yet-unsubmitted open issue report referencing behavior of the File Storage Application, and attaches screen recordings, screen shots, and/or other collected information to the new issue report that will accompany the quality control engineer's notes. As noted above, in some examples, the quality control engineer may also access and/or attach logs, stack traces, crash reports, or other information associated with the File Storage Application. Thereafter, the quality control engineer may link the File Storage Application issue report to the Email Application issue report and may submit the second issue report to the same issue tracking service.

A person of skill in the art will readily appreciate the cumbersome nature and time inefficiencies of conventional issue reporting application architectures. More specifically, a person of skill in the art will readily appreciate that these conventional time consuming mechanisms of reporting issues to issue tracking services catalyze a strong incentive for quality control engineers to only provide a bare minimum quantity and quality of information for any given issue report. This typically results in a low quantity of terse and/or otherwise undetailed issue reports, obviously reducing the usefulness of an issue tracking system to a team leveraging it for productivity and collaboration purposes.

Additionally or alternatively, it may be appreciated that these conventional mechanisms of reporting issues to issue tracking services may require substantial time commitments from skilled quality control engineers. A more efficient data entry/data aggregation process could, among other benefits, substantially increase issue report frequency, issue report quality, issue report depth/thoroughness, and so on and, as a result, substantially increase the speed and efficiency with which a team leveraging an issue tracking system for productivity and collaboration purposes can operate.

In contrast with conventional implementations, an issue reporting application leveraging methods described herein can be used by a quality control engineer, such as the quality control engineer of the preceding example. In particular, leveraging systems and methods described herein, the quality control engineer can launch an issue reporting application (in this example, the "Issue Reporting Application") and select a user interface element indicating to the Application that the quality control engineer intends to draft at least one issue report that details the behavior observed by the quality control engineer with respect to the above-described example task of adding an attachment to an email using both the Email Application and the File Storage Application.

More particularly, in some embodiments, the Issue Reporting Application may present a graphical user interface through which the quality control engineer can select one or more projects that may relate to a behavior the quality control engineer intends to document. In this example, the quality control engineer may select a first project corresponding to the Email Application and second project corresponding to the File Storage Application. Thereafter, the quality control engineer may select a user interface element presented in the graphical user interface to instruct the Issue Reporting Application to generate a session identifier for each application selected by the quality control engineer.

In many embodiments, such an operation may be obfuscated or otherwise hidden from the quality control engineer; the quality control engineer may instead be presented with a button labeled "Submit" or "Begin Testing" or similar. As may be appreciated, regardless the specific graphical user interface element or elements presented to the quality control engineer, the Issue Reporting Application may generate a session identifier for each of the projects identified by the quality control engineer. In this example, the Issue Reporting Application may generate two separate and distinct session identifiers—one identifier associated with the Email Application (or, more specifically, a software development project associated with the Email Application) and a second identifier associated with the File Storage Application (or, more specifically, a software development project associated with the File Storage Application).

In this example, the Issue Reporting Application can communicate each respective session identifier to an instance of each respective application executing on the client device. In some examples, the Issue Reporting Application may cache or otherwise store a session identifier, such as described herein, such that an application under test (such as the Email Application or the File Storage Application of the present example) can request the same from the Issue Reporting Application at a later or otherwise more appropriate time.

Thereafter, the quality control engineer can launch either or both the Email Application or the File Storage Application and interact with those application(s) in a manner that reproduces the behavior discovered by the quality control engineer. Both applications, having each received a respective one session identifier, can automatically transition to a "debugging mode." When in the debugging mode, these applications under test can be configured to (without limitation): log their respective actions, memory utilization, processor utilization, object instantiation, framework/library usage, network utilization, and so on; record interactions between a user (e.g., quality control engineer) with the user interface via still images or screen capture (e.g., capturing a sequence of screenshots and/or a screen recording); elevate a logging level from a production logging frequency and verbosity to a debug logging frequency or verbosity; and so on. It may be appreciated that the foregoing examples are not exhaustive; a debugging mode such as described herein can cause an application under test to generate, retrieve, or otherwise obtain any suitable information relevant to debugging or testing of that application.

Once the behavior discovered by the quality control engineer has been duplicated, the quality control engineer can return to the Issue Reporting Application. The Issue Reporting Application can receive from both applications under test all captured debugging information captured by those applications during the debugging session. More particularly, each application under test can tag debugging information with its respective session identifier/context key. In this manner, when the Issue Reporting Application receives debugging information from an application under test, the Issue Reporting Application can readily identify which debugging session corresponds to the received debugging information.

Once the Issue Reporting Application receives session-tagged debugging information, the Issue Reporting Application can populate one or more issue report templates with that data. For example, as noted above, session-tagged debugging information can include logs and/or crash reports which may be formatted as computer-readable files. In such examples, session-tagged debugging information formatted as computer-readable files can be appended as attachments to an issue report template. In another example, session-tagged debugging information can include processor and/or memory utilization. In this example, the Issue Reporting Application can analyze the processor and/or memory utilization data to determine whether either data exceeds a threshold defining unexpected utilization.

If either memory or processor utilization exceeds the threshold, the Issue Reporting Application can append a note to an issue report template that indicates unexpectedly high utilization. The foregoing examples are not exhaustive; a person of skill in the art will readily appreciate that an Issue Reporting Application, such as described herein can be configured to append any suitable session-tagged debugging information into any suitable issue report in any suitable manner. Further, a person of skill in the art will readily appreciate that an Issue Reporting Application, such as described herein can be configured to analyze any suitable session-tagged debugging information to add metadata obtained therefrom to any suitable issue report in any suitable manner.

Continuing the simplified example presented above, the Issue Reporting Application may be configured to: select an issue report template based on the Email Application session identifier; populate the issue report template with the name of the Email Application, one or more persons associated with the Email Application project; append the name of the quality control engineer to the issue report template; attach session-tagged logs to the issue report template; append crash reports to the issue report template; append screen shots to the issue report template; append screen recordings to the issue report template; generate a plain-text or otherwise human readable summary of user interface interactions (e.g., "press button 1, then press button 2, then enter text in field 1" and so on); and so on. Similar actions may be performed with session-tagged debugging information associated with the File Storage Application. As a result of these operations, the quality control engineer can, when opening the Issue Reporting Application, be presented with multiple issue report templates, prepopulated with information relevant to each specific issue report and specific to individual applications/projects.

As noted above, FIGS. 3-4 reference embodiments in which a quality control engineer may leverage a single electronic device, referred to in these embodiments as a client device, to operate both an issue reporting application and an application under test. As noted with respect to many embodiments described herein, a client device may be any suitable electronic device configured to, or otherwise capable of, communicating with and/or exchanging information or computer-readable data with an issue tracking service (or server), such as described herein.

An example client device, as noted above, is a mobile electronic device such as a smart phone. In these examples, the mobile device may include one or more hardware resources (e.g., processors, input devices, memory, data stores, displays, and so on; collectively referred to herein as "resource allocations") that can be leveraged by the mobile device to, without limitation: access a persistent memory, by a processor, to retrieve executable instructions; load executable instructions retrieved from persistent memory into working memory or volatile memory; execute executable instructions stored in working memory to instantiate an instance of an application, such as an application under test and/or an issue reporting application, defined by the executable instructions; and so on. For simplicity of description, the embodiments that follow reference a mobile device as an example of a client device, although it may be appreciated that this is merely one example and that in further embodiments, other client devices may be suitable.

FIG. 3 depicts a system diagram of a portion of an issue tracking system 300. In particular, the figure depicts an example client device, such as described herein, executing an instance of an application under test and an instance of an issue reporting application. As with other embodiments described herein, the client device 302 of the issue tracking system 300 can be any suitable electronic device and can be configured as described above with reference to FIG. 2 or FIG. 1. Similarly, it may be appreciated that the client device 302 can be communicably coupled to an issue tracking service of a host server, such as described above; for simplicity of description and illustration these elements are omitted from FIG. 3.

As with other client devices described herein, the client device 302 can be configured to execute one or more instances of one or more applications. In particular, the client device can include a processor, a working memory, a persistent memory, and/or one or more displays or networking connections. In these examples, the processor of the client device 302 can be configured to retrieve one or more instructions stored in the persistent memory and can execute those instructions to instantiate one or more software applications by leveraging the working memory for temporary storage. Such applications, which as described in reference to other embodiments referenced and described herein, can include an issue reporting application and/or an application under test. In other examples, multiple applications under test can be instantiated. It may be appreciated that the foregoing described information/signal flow description of processes of instantiating or otherwise launching an application, such as described herein are not exhaustive of the various methods that may be leveraged by or performed by a processor of a client device, such as the client device 302. In other embodiments, software applications may be launched in any other suitable manner.

In the illustrated embodiment, the client device 302 has instantiated two separate applications, an issue reporting application 304 and an application under test 306. As with other embodiments described herein, multiple applications under test can be instantiated by the client device 302 and can be communicably coupled to the issue reporting application 304; FIG. 3 depicts only a single application under test for simplicity of illustration.

As with other embodiments described herein, the various instances of applications can each generate their own respective graphical user interface. In particular, the issue reporting application 304 can leverage the display of the client device 302 to render a graphical user interface 308 and the application under test can leverage the display of the client device 302 to render a graphical user interface 310. In some examples, the client device 302 can present each of the graphical user interfaces 308, 310 simultaneously (e.g., via windowing) or, in other embodiments, display of the graphical user interfaces 308, 210 may be mutually exclusive; only one interface may be shown at a time.

As with other embodiments described herein, the issue reporting application 304 and the application under test 306 can be configured to exchange information, such as described herein, in a number of suitable ways. In particular, the issue reporting application 304 can be configured to pass by reference or by value a session identifier 312 to the application under test 306. As with other embodiments described herein, the session identifier 312 may be used by the application under test 306 to tag or otherwise organize or sort debugging data (or context information) that may be captured during a debugging session, such as described above. More specifically, the application under test 306 can pass by reference or by value a session-tagged debug data package 314 back to the issue reporting application 304.

The application under test 306 and the issue reporting application can exchange the session identifier 312 and/or the session-tagged debug data package 314 in a number of suitable ways. Examples include, but are not limited to: storing at a persistent memory address by the issue reporting application 304 data that may be retrieved at any suitable time (e.g., on demand, in response to an event report or notification, according to a schedule, and so on) by the application under test 306; storing at a working memory address by the issue reporting application 304 data that may be retrieved at any suitable time (e.g., on demand, in response to an event report or notification, according to a schedule, and so on) by the application under test 306; generating an event to push to a system event queue by the issue reporting application 304 in a format suitable to be recognized and consumed by the application under test 306; via an inter-app communications protocol; via an inter-app messaging service; and so on. It may be appreciated that the foregoing examples are not exhaustive and that two instances of two different applications may suitably communicate in a number of different ways.

Independent of the method(s) by which the application under test 306 and the issue reporting application 304 exchange the session identifier 312 and the session-tagged debug data package 314, (or other data such as context data or context information) it is understood that the information can be used by either or both applications to inform one or more operations of those applications.

For example, as noted with respect to other embodiments described herein, the issue reporting application 302 may be configured to render one or more graphical user interface elements 316 in the graphical user interface 308. These user interface elements can be used by a quality control engineer to provide input to an issue report, to trigger the issue reporting application 302 to generate or retrieve the session identifier 312, or, in other cases, can be populated automatically by the issue reporting application itself by consuming and/or otherwise parsing or analyzing the session-tagged debug data package 314 received from the application under test.

Similarly, the application under test 306 may be configured to render one or more graphical user interface elements 318. These elements can receive user inputs from the quality control engineer—or any other user of the application under test—to instruct the application under test 306 to perform one or more operations. As with other embodiments described herein, user interactions with the graphical user interface elements 318 can be captured when the application under test 306 enters a debugging mode in response to receiving the session identifier from the issue reporting application 304.

In some embodiments, the client device 302 can be further configured to optionally provide another a graphical user interface element identifying a particular debugging session when the application under test 306 is in focus and/or is otherwise being used by the quality control engineer. An example element is shown as the session-identifying user interface element 320. In these examples, a quality control engineer can reference the session-identifying user interface element 320 (such as a pull-down element or slide-over element) when operating the application under test 306 as a reminder of which debugging session, and correspondingly which issue report template or issue report draft, is associated with the engineer's interactions with the application under test 306.

For example, in one embodiment, a quality control engineer can launch the issue reporting application 304 and can operate the graphical user interface 308 to begin a debugging session (e.g., cause the issue reporting application 304 to generate the session identifier 312) to record information describing operations of the application under test 306 when a particular feature of that application is used by the engineer. In one specific example, the application under test 306 is a social media application and the feature of that application being tested by the engineer may be related to behavior of a text input field presented when a certain social media profile is viewed.

In this example, the quality control engineer can select an issue reporting template or may opt to create a new issue report via the graphical user interface 308 presented by the issue reporting application 304. As with other embodiments described herein, the quality control engineer can add bibliographic and/or descriptive data to the draft issue report, such as the engineer's name, the project name associated with the application under test 306, and an issue title. An example issue title (which may be context data) may be "Text input above submit button in profile view hangs when profile is loaded."

Once the engineer enters such data, the engineer may switch to the application under test 304. As with other embodiments described herein, before, while, or after the instances of application focused by the client device 302 change (e.g., while the engineer switches from the issue reporting application 304 to the application under test 306), the issue reporting application 304 can send by reference or by value the session identifier 312 to the application under test 306 which in turn can enter a debugging mode. In some embodiments, the session-identifying user interface element 320 can be updated to remind the engineer that the engineer is currently testing the text input field above the submit button. For example, the session-identifying user interface element 320 may be updated with descriptive text identical to the issue title provided by the engineer. In other examples, the session-identifying user interface element 320 may be shortened to read "Debugging Mode" or similar. In other examples, the session-identifying user interface element 320 may include both a debugging flag indication and descriptive text provided by the engineer or extracted from the issue title (or another portion of engineer-entered content) of the issue report draft started by the engineer when using the issue reporting application 304 prior to launching the application under test 306. For example, the session-identifying user interface element 320 may be updated by the application under test 306 or the issue reporting application 304 to read: "Debug: Text Input Hangs." It may be appreciated that the foregoing examples are not exhaustive, in other cases, other text can be included in the session-identifying user interface element 320.

in other examples, the session-identifying user interface element 320 may be a portion of a drop-down menu or slide-in overlay that adjusts positioning of the graphical user interface 310 of the application under test 306. For example, the session-identifying user interface element 320 may exhibit a similar appearance to an active-call notification rendered by a mobile phone operating system.

In some examples, the session-identifying user interface element 320 can be persistently shown above or below the graphical user interface 310, whereas in others, the session-identifying user interface element 320 may be only temporarily or periodically shown.

In some embodiments, the session-identifying user interface element 320 can be provided with an attention-soliciting color, such as red or green, that contrasts dramatically against other adjacent elements of the graphical user interface 310 of the application under test 306.

In some embodiments, the session-identifying user interface element 320 may be rendered in an animated fashion. In some embodiments, the session-identifying user interface element 320 may be presented or rendered alongside a notification or status bar of the client device 302.

In still further embodiments, the session-identifying user interface element 320 can be rendered while a haptic feedback is provided. In other cases, an acoustic or audible feedback can be provided with the session-identifying user interface element 320. In still further examples, the session-identifying user interface element 320 can be rendered with visual emphasis, such as enhanced brightness or in a flashing manner. In yet other examples, combinations of the foregoing example presentation techniques can be provided.

The foregoing examples are not exhaustive. In some embodiments, the session-identifying user interface element 320 may not be required and/or may not be rendered by the client device 302 or the application under test 306. Instead, it may be appreciated that the foregoing example embodiments described in reference to FIG. 3 are provided as examples of graphical user interfaces that may be rendered by and/or otherwise informed by data exchanged between an issue reporting application (such as the issue reporting application 304) and an application under test (such as the application under test 306), such as described herein. As such, more generally and broadly, it may be appreciated that a graphical user interface of an instance of an application, such as described herein can be influenced by and/or informed by a session identifier and/or debugging data or context data such as described herein.

For example, FIG. 4 depicts a system diagram of an example client device, such as described herein, configured to facilitate exchange of session data and/or context data between an instance of an application under test and an instance of an issue reporting application. In particular, in this example, an issue tracking system 400 includes a client device 402 in communication with an issue tracking service 404 that leverages physical and/or virtual resources (identified as the resource allocations 406a) of a host device such as described herein.

The client device 402 can instantiate both an issue reporting application 406 (leveraging physical and/or virtual resources of the client device, identified as the resource allocations 406a) and an application under test 408 (leveraging physical and/or virtual resources of the client device, identified as the resource allocations 408a). The issue reporting application 406 can generate a session identifier 410 and pass by reference or by value that session identifier 410 to the application under test which, in response thereto, can enter a debugging mode. After a debugging session has been completed by an quality control engineer, the application under test 408 can send back to the issue reporting application both the session identifier and debugging/context data as a session-tagged debug data package 412. In response to receiving debugging/context data, the issue reporting application 406 can select an issue report template, a prepopulated issue report draft, or a new issue report and can populate fields of the selected issue report with information obtained from or otherwise extracted from the session-tagged debug data package 412. Thereafter, the issue reporting application 406 can transmit a complete issue report 414 to the issue tracking service 404.

These foregoing embodiments depicted in FIG. 3-4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that data and/or information (including session keys, context keys, session identifiers, context data/information, and any other suitable computer-readable data) may be exchanged between instances of applications executed by the same client device in a number of suitable ways, adhering to a number of suitable protocols, and/or complying with a number of suitable forms or formats.

Examples include, but are not limited to: storing at a persistent memory address by an instance of a first application data that may be retrieved at any suitable time (e.g., on demand, in response to an event report or notification, according to a schedule, and so on) by an instance of a second application; storing at a working memory address by an instance of a first application data that may be retrieved at any suitable time (e.g., on demand, in response to an event report or notification, according to a schedule, and so on) by an instance of a second application; generating an event to push to a system event queue by an instance of a first application in a format suitable to be recognized and consumed by an instance of a second application; via an inter-app communications protocol; via an inter-app messaging service; and so on. It may be appreciated that the foregoing examples are not exhaustive and that two instances of two different applications may suitably communicate in a number of different ways.

For example, in other cases, portions and/or all communications between two instances of applications executed by a client device may be facilitated in whole or in part by another service or instance of a service, either local or remote service, such as an instance of a third application executed by the client device and/or a remote service, such as a server or a separate electronic device or separate client device.

Figure 5:
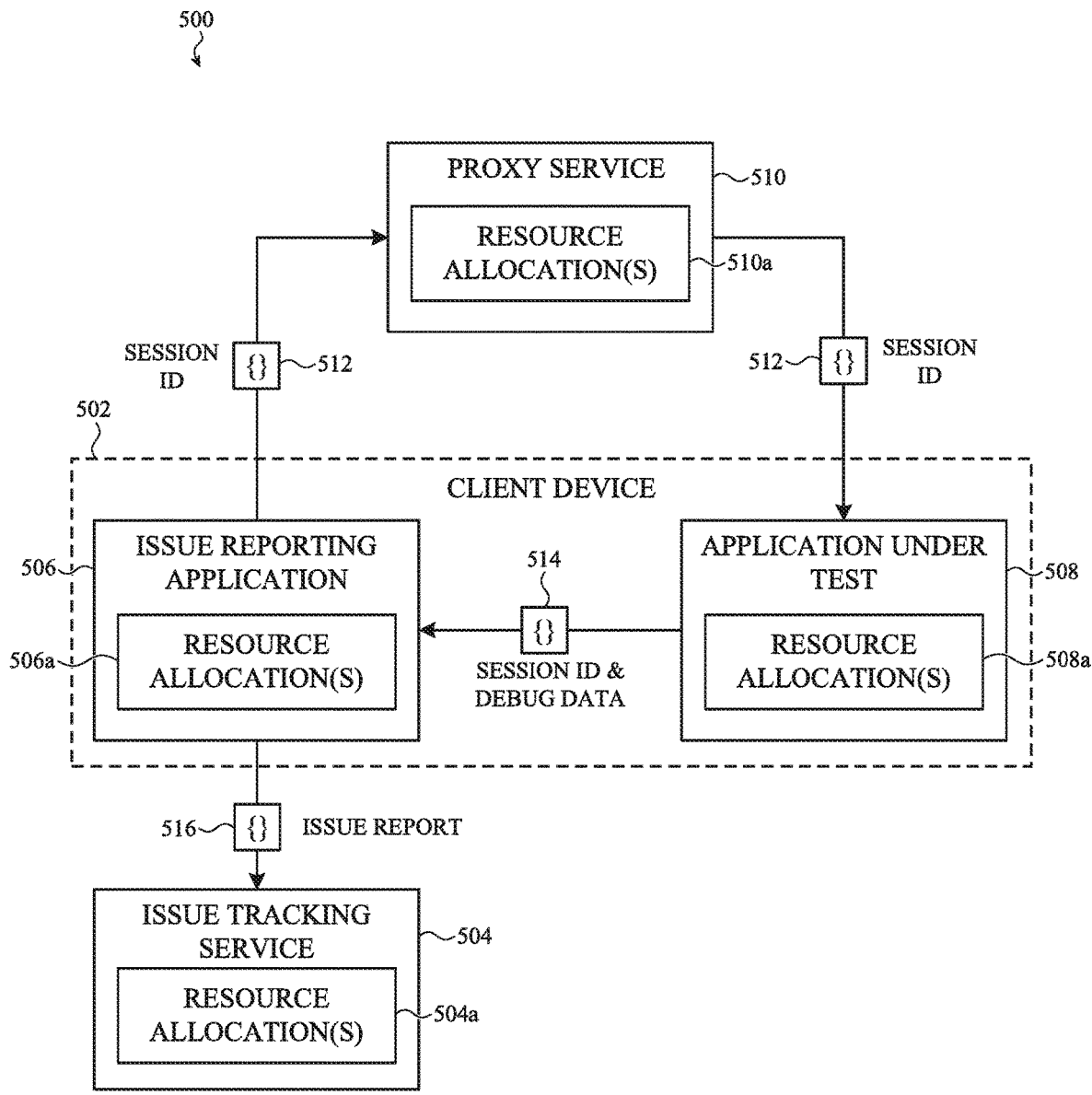
FIG. 5 depicts a system diagram of an example client device, such as described herein, configured to leverage a host service to facilitate exchange of session data and/or context data between an instance of an application under test and an instance of an issue reporting application.
Figure 6:
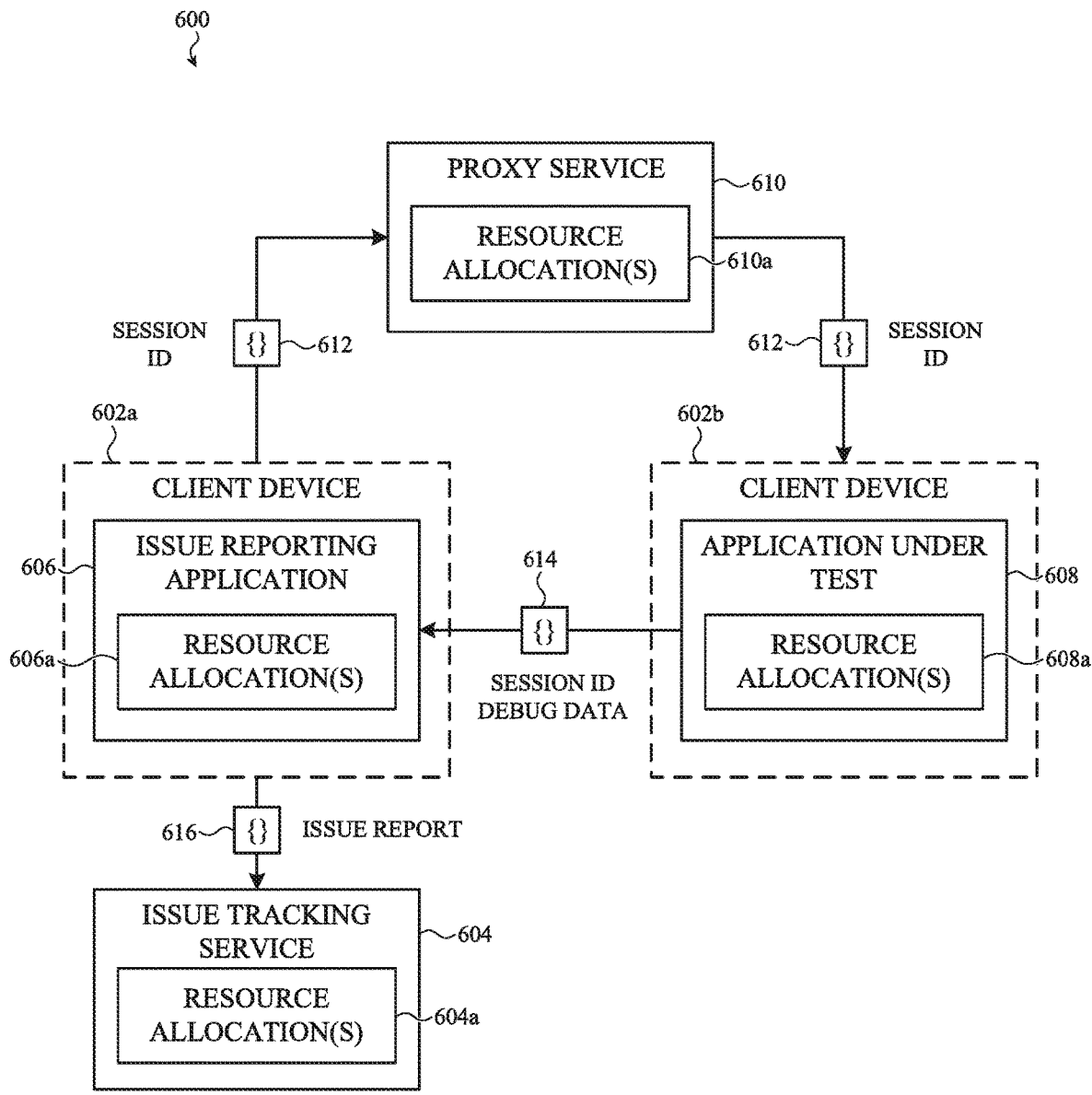
FIG. 6 depicts an example system, such as described herein, configured to leverage a host service to facilitate exchange of session data and/or context data between an instance of an application under test executed by a first client device and an instance of an issue reporting application executed by a second client device.
Figure 7:
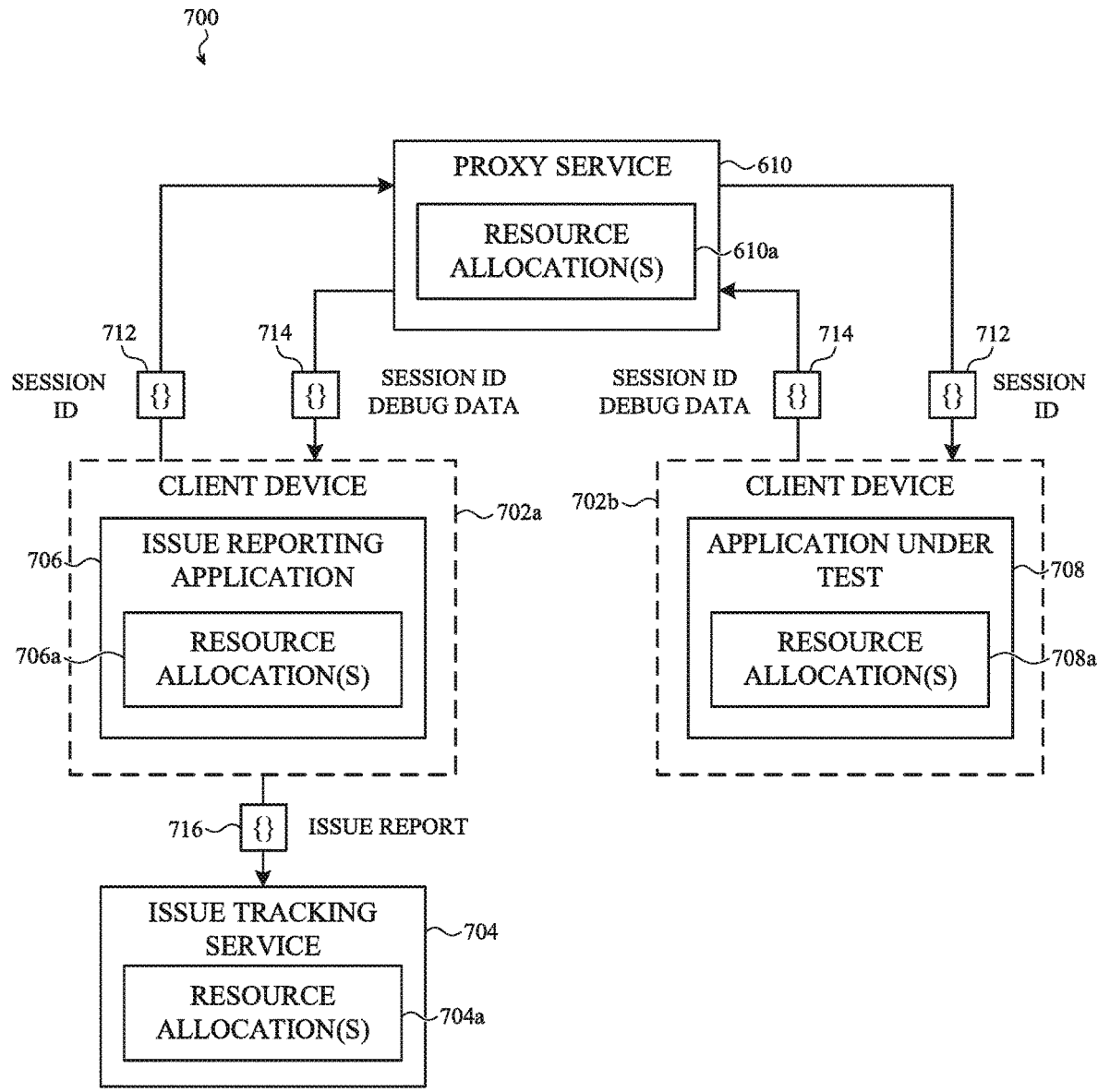
FIG. 7 depicts an example system, such as described herein, configured to leverage a host service to facilitate exchange of information, including session data and/or context data, between an instance of an application under test executed by a first client device and an instance of an issue reporting application executed by a second client device.

Generally and broadly, similar to other embodiments described herein, FIGS. 5-7 depict embodiments in which a client device may be used to execute and/or instantiate an application under test and an issue reporting application, such as described herein.

In contrast to embodiments described with reference to FIGS. 3-4, the embodiments shown in FIGS. 5-7 leverage a proxy service to transact information between instances of an application under test and an instance of an issue reporting application. Example information transacted by a proxy service, such as described herein can be, without limitation: context keys; session keys; session identifiers; private or public key pairs; secure shell keys; secure socket layer certificates; javascript tokens; single sign on tokens; authentication tokens; indexes; software version numbers; plugin lists; framework, library, dependency lists; framework, library, dependency versions; screenshots; cursor locations; touch locations; audio recordings; video recordings; screen recordings; timestamps; logs; crash reports; resource usage reports (e.g., processor utilization, memory utilization, database size, network activity); operating system level data, such as process lists, system information, software version information, and so on; hardware information; firmware version number; usernames; user contact information; and so on. More generally, the proxy service may be configured to transmit information that identifies a particular debugging session and information corresponding to actions taken during that debugging session.

More specifically, a "proxy service" served by a host service as described herein may be any suitable network-connected or otherwise communicably coupled computing device (e.g., server, client device, host device, virtual machine, container, and so on) that facilitates transaction of data between different instances of different applications.

An example host service, as noted above, is an Internet-connected server or cluster of servers. In these examples, the mobile device may include one or more hardware resources (e.g., processors, input devices, memory, data stores, displays, and so on; collectively referred to herein as "resource allocations") that can be leveraged by the mobile device to, without limitation: access a persistent memory, by a processor, to retrieve executable instructions; load executable instructions retrieved from persistent memory into working memory or volatile memory; execute executable instructions stored in working memory to instantiate an instance of an application, such as an application under test and/or an issue reporting application, defined by the executable instructions; and so on.

The proxy service of these embodiments may be configured to receive from an instance of an issue reporting application a context key or session identifier and, thereafter, transmit the receive context key or session identifier (or data derived therefrom, such as a hash of the received key or an encrypted counterpart to the received context key or session identifier) to an instance of an application under test. In this example, as with other embodiments described herein, the application under test can be operated by a user of the client device executing that application and information describing and/or tracking that usage (e.g., logs, screenshots, screen recordings, user interface elements, touch/pointer locations, and so on) can be captured. Thereafter, the captured information, which can be referred to as "context data" or "session data" or "issue data" or similar terms can thereafter be tagged with the received context key and transmitted back to the issue reporting application, either directly or via a proxy service. Upon receiving information from an application under test, regardless whether that information is received directly or indirectly, the issue reporting application can retrieve from a persistent memory or a local or remote database an issue reporting template selected based on or otherwise corresponding to the context key received from the application under test. Thereafter, the issue reporting application can populate the retrieved issue reporting template and can present the populated issue reporting template to the user for review and/or submission.

As a result of such embodiments and equivalents thereof, a user of an issue tracking application can more rapidly and effectively add information to an issue report, thereby providing richer and more detailed feedback to an issue tracking system, such as described herein.

For example, FIG. 5 depicts a system diagram of an example client device, such as described herein, configured to facilitate exchange of session data and/or context data between an instance of an application under test and an instance of an issue reporting application via, at least in part, a proxy service. In particular, in this example, an issue tracking system 500 includes a client device 502 in communication with an issue tracking service 504 that leverages physical and/or virtual resources (identified as the resource allocations 506a) of a host device such as described herein.

As with other embodiments described herein, and in particular FIG. 4, the client device 502 can instantiate both an issue reporting application 506 (leveraging physical and/or virtual resources of the client device, identified as the resource allocations 506a) and an application under test 508 (leveraging physical and/or virtual resources of the client device, identified as the resource allocations 508a).

As with other embodiments described herein, the issue reporting application 506 can generate a session identifier 512 and pass by reference or by value that session identifier to a proxy service 510 operated on or by a remote or local server (or other application instantiated by the client device 502) that can include one or more processors, working memory, persistent memory, network connections and so on collectively identified as the resource allocations 510a. In some cases, the proxy service 510 can pass the session identifier 512 directly to the application under test 508. In other cases, the proxy service 510 can encrypt or otherwise modify the session identifier 512 prior to forwarding/sending the session identifier 512 to the application under test 506. As with other embodiments described herein, the session identifier 512 can be any suitable alphanumeric string of characters, token, or data structure or data item representing or otherwise identifying a particular debugging session defined by an issue reporting application, such as described herein.

Once the proxy service 510 passes the session identifier 512 to the application under test 506, the application under test 508 can, in response thereto, enter a debugging mode as with other embodiments described herein. After a debugging session has been completed by an quality control engineer, the application under test 508 can send back to the issue reporting application both the session identifier and debugging/context data as a session-tagged debug data package 514.

In response to receiving debugging/context data, the issue reporting application 506 can select an issue report template, a prepopulated issue report draft, or a new issue report and can populate fields of the selected issue report with information obtained from or otherwise extracted from the session-tagged debug data package 514. Thereafter, the issue reporting application 506 can transmit a complete issue report 516 to the issue tracking service 504.

The foregoing example data flow/signal flow/networking description of an issue tracking system, such as described herein is merely one example. Other architectures are possible. For example, in some cases, an application under test and an issue reporting application may be instantiated by two separate client devices.

FIG. 6 depicts a system diagram of an issue tracking system, such as described herein, configured to facilitate exchange of session data and/or context data between an instance of an application under test executed on one client device and an instance of an issue reporting application executed by a separate client device via, at least in part, a proxy service.

In particular, in this example, an issue tracking system 600 includes a client device 602a in communication with an issue tracking service 604 that leverages physical and/or virtual resources (identified as the resource allocations 606a) of a host device such as described herein.

As with other embodiments described herein, the client device 602a can instantiate an issue reporting application 606 by leveraging physical and/or virtual resources of the client device 602a, identified as the resource allocations 606a. A separate client device, the client device 602b can instantiate an application under test 608 leveraging physical and/or virtual resources of the client device 602b, identified as the resource allocations 608a. The client devices 602a, 602b can be the same type of client device (e.g., mobile electronic devices) or may be different electronic devices. For example, in one example, in one embodiment the client device 602a is a cellular phone and the client device 602b is a laptop computing device.

As with other embodiments described herein, the issue reporting application 606 can generate a session identifier 612 and pass by reference or by value that session identifier to a proxy service 610 operated on or by a remote or local server (or other application instantiated by the client device 602a) that can include one or more processors, working memory, persistent memory, network connections and so on collectively identified as the resource allocations 610a. In some cases, the proxy service 610 can pass the session identifier 612 directly to the application under test 608. In other cases, the proxy service 610 can encrypt or otherwise modify the session identifier 612 prior to forwarding/sending the session identifier 612 to the application under test 606. As with other embodiments described herein, the session identifier 612 can be any suitable alphanumeric string of characters, token, or data structure or data item representing or otherwise identifying a particular debugging session defined by an issue reporting application, such as described herein.

Once the proxy service 610 passes the session identifier 612 to the application under test 606, the application under test 608 can, in response thereto, enter a debugging mode as with other embodiments described herein. After a debugging session has been completed by an quality control engineer, the application under test 608 can send back to the issue reporting application both the session identifier and debugging data as a session-tagged debug data package 614.

In response to receiving debugging data, the issue reporting application 606 can select an issue report template, a prepopulated issue report draft, or a new issue report and can populate fields of the selected issue report with information obtained from or otherwise extracted from the session-tagged debug data package 614. Thereafter, the issue reporting application 606 can transmit a complete issue report 616 to the issue tracking service 604.

In still further embodiments, a proxy service can be used to send and receive both session identifiers and debugging data, such as described herein. For example, FIG. 7 depicts an embodiment similar to FIG. 6 in which an issue tracking system 700 includes two client devices, the client device 702a, 702b and an issue tracking service 704. The client device 702a instantiates an issue reporting application 706 leveraging the resource allocations 706a and the client device 702b instantiates an application under test 708 leveraging the resource allocations 708a. The embodiment further includes a proxy service 710 that executes over the resource allocations 710a.

In contrast with the embodiment depicted in FIG. 6, this system 700 is architected such that the proxy service 710 is configured to send and receive a session identifier 712 and a session-tagged debug data package 714 between the issue reporting application 706 and the application under test 708. Once the issue reporting application 706 receives the session-tagged debug data package 714, it can select and/or populate an issue report 716 that can be transmitted or otherwise communicated to the issue tracking service 704.

These foregoing embodiments depicted in FIG. 5-7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 8:
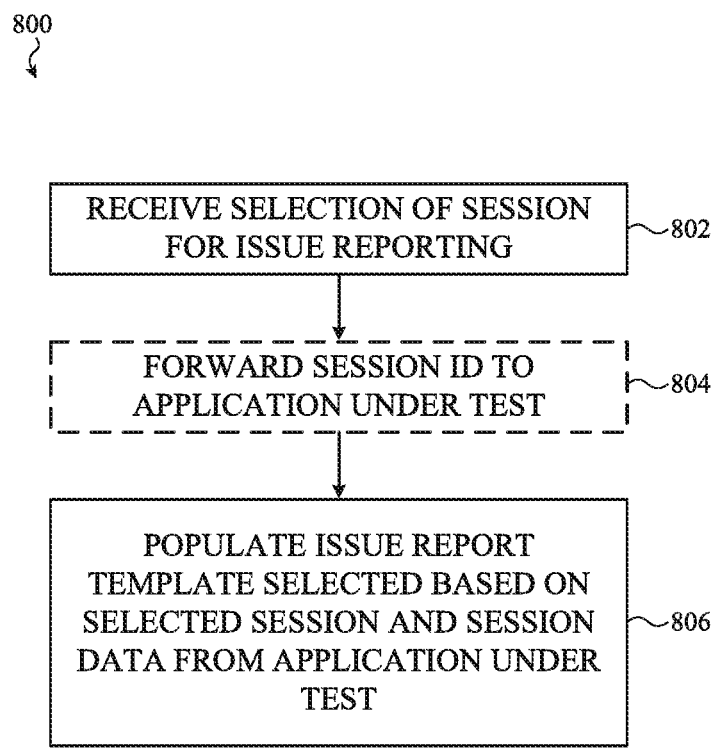
FIG. 8 is a flowchart depicting example operations of a method of leveraging session data to populate an issue reporting template.

FIG. 8 is a flowchart depicting example operations of a method of leveraging session data to populate an issue reporting template. The method 800 can be performed in whole or in part by a host device or a client device, such as described herein. More specifically, operations of the method 800 can be performed in whole or in part by an instance of a client application executed by a host device or a client device such as described herein. The client application may be an issue reporting application or, in other examples, may be an application under test. For simplicity of description, the embodiment that follows reference a configuration in which the method 800 is performed by an instance of an issue reporting application executed by a client device communicably coupled to an issue tracking service of an issue tracking system such as described herein. As with other embodiments, the issue reporting application instance can be supported by one or more physical or virtual resource allocations of the client device, including processor allocations, memory allocations, networking allocations and so on.

The method 800 includes operation 802 at which a selection of a session is received. The selection can be received by operation of a graphical user interface of the issue reporting application. In some embodiments, the graphical user interface can be presented for the benefit of a quality control engineer. For example, the graphical user interface may present a question or survey to a quality control engineer requesting input whether the engineer would like to initiate a debugging session. In response, the quality control engineer can select a graphical user interface element indicating an intent to begin debugging a particular application, referred to as the application under test. In some cases, the graphical user interface can present a set of applications from which the quality control engineer can choose one or more applications. Once a selection is made, the quality control engineer can select or input a feature or behavior of that selected application that the quality control engineer intends to test.

For example, in one embodiment, the quality control engineer is presented with a graphical user interface requesting a selection between Application A, Application B, and Application C. In response, the quality control engineer selects Application A. Thereafter, the graphical user interface can request input from the quality control engineer asking which feature or behavior of Application A the quality control engineer intends to test. In this example, the quality control engineer may provide text input via a text input dialog indicating that the quality control engineer intends to test a Photo Upload feature of Application A.

With this information provided by the quality control engineer, the issue reporting application can query an issue tracking service to obtain and/or retrieve information related to either or both Application A or the Photo Upload feature of Application A. For example, in some embodiments, the issue reporting application may be configured to query the issue tracking service for similar issues that have already been submitted to the system, such as issues in Project A (which is a software development project that supports Application A) that reference the Photo Upload feature.

In some embodiments, the issue reporting application may receive multiple results from the issue tracking service. In such examples, the issue reporting application can leverage any suitable technique to extract similar or overlapping features from each returned issue report. In other cases, the issue reporting application may receive a limited set or a small number of result from the issue tracking service, such as a single issue report. In these embodiments, the issue reporting application can be configured to generate an issue report template with prepopulated common information based, at least in part, on the results of the query of the issue tracking system.

In still further examples, the issue reporting application can be configured to select an issue reporting template from a set of existing issue reporting templates associated with Project A, Application A, or the Photo Upload feature. In some examples, the quality control engineer may generate one or more templates from which the issue reporting application selects. In other cases, a company-wide or team-wide database of issue reporting templates may be accessed and a single issue report template may be selected by the issue reporting application therefrom.

Continuing the above example, the issue reporting application may present to the quality control engineer, after having received input information from the quality control engineer such as described above, a partially or entirely prepopulated issue report, referred to herein as a prepopulated issue report template or an issue report draft or a ticket. Example information that may be included in the issue report draft includes but may not be limited to: a project name; an issue type; an issue summary; an issue priority; a reference to particular components of the project; a reference to particular versions of the project or one or more of its outputs; an issue/ticket assignee; an issue reporter (e.g., the quality control engineer's name, which may be inserted by the issue reporting application based on a current logged-in username accessible to the issue reporting application); an issue report date/timestamp; and so on.

In addition to the foregoing, the issue reporting application may advance the method 800 to operation 804 at which, optionally, a session identifier is created and logically linked to the issue report template discussed above. In these embodiments, and many others, the issue reporting application may be configured to transmit or otherwise pass the session identifier to the application under test. In other examples, the session identifier may not be required to be transmitted to the application under test; the session identifier may be held in local memory and may be used exclusively by the issue reporting application to reference the issue report template/draft referenced above.

Thereafter, at operation 806, the issue reporting application may receive from the application under test, a third application or process, or from any other suitable source, at least one item of debugging data, which may be tagged with the session identifier created and/or transmitted at operation 804. As noted above, debugging data can include, but may not be limited to: crash reports; logs; memory utilization reports; object instantiation reports; stack traces; network utilization reports; event timelines; user interface interaction events/timelines; user interface dwell times; screen recordings; screen shots; and so on. This information can be retrieved by the issue reporting application, but an operating system of the client device, by the application under test, by another application or process executed by the operating system, and so on. More generally, it may be appreciated that debugging information, such as described herein can be aggregated and/or collected in a number of suitable ways.

Once the issue reporting application receives debugging data, regardless of source or format, it can parse that data in order to continue populating the issue report template draft referenced above. For example, the issue reporting application can be configured to select certain file types based on extension and append those file types as attachments to the issue report template draft. Example file types that may be added as extensions include: image file types; audio file types; video file types; crash log file types; and so on.

In other cases, the issue report template draft can be populated with data or information derived from the debugging data. For example, a timeline of user interaction events can be translated into human-readable text and can be appended to the description of the issue report template.

It may be appreciated that these foregoing examples are not exhaustive; other methods of parsing and/or extracting information from debugging data and appending that information to an issue report may be considered or implemented.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A system for reporting issues to an issue tracking system, the system comprising:
   a host server executing an issue tracking service configured for use by a software development team to track one or more issue reports detailing one or more bugs in one or more software products; and
   a mobile device remote to the host server and executing an issue reporting application instance in communication with the issue tracking service and an instance of an application under test, the issue reporting application instance configured to:
      generate, by the issue reporting application, a session identifier;
      pass, by the issue reporting application, the session identifier to the instance of the application under test;
      cause to be displayed, by the application under test, a graphical user interface element with a graphical user interface of the application under test, the graphical user interface element comprising an indicator corresponding to the session identifier; and
      receive, by the issue reporting application from the application under test, debug data generated by the application under test while being used by a user of the mobile device, the debug data tagged by the application under test with the session identifier;
      select, by the issue reporting application, an issue report template from a set of issue report templates based, at least in part, on the session identifier and the debug data;
      automatically populate at least one field of the issue report template based, at least in part, on the received debug data; and
      transmit the populated issue report template as a new issue record to the issue tracking service.

2. The system of claim 1, wherein:
   the issue reporting application instance is communicably coupled to the instance of the application under test.

3. The system of claim 1, wherein the instance of the application under test comprises a graphical user interface that presents the session identifier to the user of the instance of the application under test.

4. The system of claim 1, wherein the debug data comprises at least one of:
   a screen shot;
   a screen recording;
   a crash report; or
   a log.

5. The system of claim 1, wherein the session identifier is passed by reference to the application under test.

6. The system of claim 1, wherein the mobile device is a cellular telephone.

7. A method of automatically populating an issue report to be submitted to an issue tracking system, the method comprising:
   generating, by a first application instance executing on a mobile device, a session identifier;
   passing, by the first application instance, the session identifier to a second application instance executing on the mobile device;
   entering, by the second application instance, a debug mode in response to receiving the session identifier from the first application instance;
   modifying a graphical user interface of the second application instance to indicate the debug mode is active;
   receiving, by the second application instance the debug mode is active, at least one user input to the graphical user interface of the second application instance;
   tagging with the session identifier, by the second application instance, debug information generated by the second application instance during the at least one user input;
   passing, by the second application instance, the tagged debug information to the first application instance;
   exiting, by the second application instance, the debug mode;
   modifying the graphical user interface of the second application instance to not indicate that the debug mode is active;
   selecting, by the first application instance, an issue report template from a set of issue report templates based on the session identifier and the tagged debug data; and populating, by the first application instance, the selected issue report template with the tagged debug information.

8. The method of claim 7, wherein the first application instance is an issue reporting application communicably coupled to the issue tracking system.

9. The method of claim 8, comprising passing the populated issue report template to the issue tracking system.

10. The method of claim 8, wherein populating the selected issue report with the tagged debug information comprises attaching a file extracted from the debug data to the selected issue report.

11. The method of claim 10, wherein the file comprises one or more of:
an audio file;
a screen recording; or
a screen shot.

12. The method of claim 7, wherein the first application instance and the second application instance are executed on the same electronic device.

13. A mobile device for interacting with an issue tracking system, the mobile device executing an instance of an issue reporting application configured to:
render a first graphical user interface by the issue reporting application;
receive, by the issue reporting application, input from a user to the first graphical user interface;
generate, by the issue reporting application, a session identifier based on the input to the first graphical user interface;
causing to become active, based on the input, a second graphical user interface rendered by a second application executed by the mobile device;
cause to be displayed a graphical user interface element within the second graphical user interface, the graphical user interface element comprising an indicator corresponding to the session identifier and indicating that a debug mode of the second application is active;
receive, at the second application, debug data generated by the second application during a user input to at least one user interface element of the second graphical user interface;
tag, by the second application, the debug data with the session identifier;
receive, at the issue reporting application, tagged debug data;
extracting, by the issue reporting application, the session identifier from the tagged debug data;
select an issue report template based on the extracted session identifier; and
automatically populate a field of the issue report template based on the received debug data.

14. The mobile device of claim 13, wherein automatically populating the field of the issue report template comprises attaching a file extracted from the debug data.

15. The mobile device of claim 13, wherein the client mobile device is a mobile electronic device.

16. The mobile device of claim 13, wherein the debug data received from the second application is tagged with the session identifier.

* * * * *